(12) United States Patent
Artobello et al.

(10) Patent No.: US 7,107,422 B2
(45) Date of Patent: *Sep. 12, 2006

(54) METHOD, COMPUTER PROGRAM PRODUCT, AND SYSTEM FOR GLOBAL REFRESH OF CACHED USER SECURITY PROFILES

(75) Inventors: Michael R. Artobello, Concord, CA (US); Getachew G. Birbo, San Jose, CA (US); Joyce Yuan-Sheng Hsiao, San Jose, CA (US); Sandra L. Sherrill, San Jose, CA (US); Andrew D. Tollerud, San Jose, CA (US); Jack Chiu-Chiu Yuan, San Jose, CA (US); James E. Zimmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 10/227,123

(22) Filed: Aug. 23, 2002

(65) Prior Publication Data
US 2004/0039740 A1 Feb. 26, 2004

(51) Int. Cl.
*G06F 12/14* (2006.01)

(52) U.S. Cl. .................... 711/163; 711/167; 711/126; 707/8; 707/201

(58) Field of Classification Search ............... 711/163, 711/167; 707/8, 201, 102; 345/302, 328; 709/203, 231
See application file for complete search history.

(56) References Cited

U.S. PATENT DOCUMENTS

| | | |
|---|---|---|
| 5,734,718 A * | 3/1998 | Prafullchandra ............ 713/183 |
| 5,845,293 A | 12/1998 | Veghte et al. ................ 707/202 |
| 5,897,634 A * | 4/1999 | Attaluri et al. ................ 707/8 |
| 5,897,640 A | 4/1999 | Veghte et al. ................ 707/202 |
| 5,898,760 A | 4/1999 | Smets et al. ............. 379/88.21 |
| 5,924,103 A | 7/1999 | Ahmed et al. ............... 707/201 |
| 6,216,212 B1 * | 4/2001 | Challenger et al. ......... 711/163 |
| 6,219,680 B1 | 4/2001 | Bernardo et al. |
| 6,239,793 B1 * | 5/2001 | Barnert et al. ........... 715/500.1 |
| 6,385,693 B1 | 5/2002 | Gerszberg et al. .......... 711/118 |
| 2002/0112121 A1 | 8/2002 | Gerszberg et al. .......... 711/118 |
| 2003/0097597 A1 | 5/2003 | Lewis ........................ 713/202 |
| 2003/0126136 A1 | 7/2003 | Omoigui ....................... 707/10 |
| 2003/0154110 A1 | 8/2003 | Waklter et al. ................. 705/3 |
| 2004/0034795 A1 | 2/2004 | Anderson et al. ........... 713/201 |
| 2004/0039740 A1 | 2/2004 | Artobello et al. ............... 707/9 |
| 2004/0064351 A1 | 4/2004 | Mikurak ........................ 705/7 |
| 2004/0078334 A1 | 4/2004 | Malcolm et al. .............. 705/50 |
| 2004/0111413 A1 * | 6/2004 | Birbo et al. .................... 707/9 |

FOREIGN PATENT DOCUMENTS

WO   WO 01/44904 A2   6/2001

\* cited by examiner

*Primary Examiner*—Charles Rones
*Assistant Examiner*—Belix M. Ortiz
(74) *Attorney, Agent, or Firm*—Kunzler & Associates

(57) ABSTRACT

A master dynamic aging value associated with the client is calculated responsive to an operator command to perform the global refresh. When receiving a request from a user associated with the client, a sub-dynamic aging value associated with a cached user security profile for the user is compared to the master dynamic aging value. If the sub-dynamic aging value is not equal to the master dynamic aging value, then the cached user security profile is refreshed.

22 Claims, 4 Drawing Sheets

METHOD, COMPUTER PROGRAM PRODUCT, AND SYSTEM FOR GLOBAL REFRESH OF CACHED USER SECURITY PROFILES

FIELD OF INVENTION

The present invention relates generally to accessing databases, and in particular, to globally refreshing cached user security profiles utilized to authorize user access to information controlled by a database management system (DBMS).

BACKGROUND

Databases, such as IBM's IMS (Information Management System), are well known in the art. (IMS is a trademark of International Business Machines Corporation in the United States, other countries, or both.) IMS is a hierarchical database management system (HDBMS) with wide spread usage in many large enterprises where high transaction volume, reliability, availability and scalability are of the utmost importance. IMS provides software and interfaces for running the businesses of many of the world's largest corporations.

A large DBMS, such as IMS, is highly scalable and in some enterprise environments may accommodate thousands, or even tens of thousands, of users connected to the system at any given point in time. Furthermore, the information and data managed by the DBMS may be highly sensitive data, critical to the operation of the enterprise as well as critical to the individual users of the DBMS system. Travel reservation systems, inventory control, and online banking systems are some typical examples. Therefore, it is essential that such a DBMS incorporate safeguards whereby each user of the DBMS system is authorized to make various DBMS requests.

Other aspects of a large DBMS include highly reliable operation, such as 24/7 availability, and very fast response time. Even relatively small delays in response time, magnified by thousands of users, are highly detrimental to enterprise productivity. Therefore, the authorization process discussed supra must not significantly delay a user's request to update or retrieve information. To this end, a large DBMS may retain security information for each active user in cache memory for ready access when the need arises. This enhances performance by eliminating I/O processing that would otherwise be required to obtain the necessary security information required to perform the authorization checking.

Therefore, caching user security information (hereinafter referred to as a cached user security profile) is known in the art and is a valuable technique for enhancing DBMS performance by eliminating I/O processing to obtain user security information when performing authorization checking for the user. However, this presents a significant problem in those unusual situations where the integrity of the cached user security profiles is questionable and a global refresh of all cached user security profiles must occur. The obligation to support 24/7 precludes the ability to shut the DBMS down, even for a few minutes, to refresh each of the possibly tens of thousands of cached user security profiles from permanent storage. Yet, to allow access to the DBMS during the global refresh would greatly compromise the integrity of the system since cached user security information of questionable validity may be used during the authorization processing.

Accordingly, there is a great need to provide a global refresh of cached user security profile information without significantly impacting the availability or response time of the DBMS system while at the same time ensuring complete integrity of the DBMS authorization checking during a global refresh operation.

SUMMARY OF THE INVENTION

To overcome these limitations in the prior art briefly described above, the present invention provides a method, program product and apparatus for performing a global refresh of cached user security profiles associated with a client in a database management system. A master dynamic aging value associated with the client is calculated responsive to an operator command to perform the global refresh. When receiving a request from a user associated with the client, a sub-dynamic aging value associated with a cached user security profile for the user is compared to the master dynamic aging value. If the sub-dynamic aging value is not equal to the master dynamic aging value, then the cached user security profile is refreshed.

Computer instructions that calculate and save a master dynamic aging value for a client of a database management system is hereinafter referred to as a "dynamic aging aware global refresh routine".

In another embodiment of the present invention, the above-described method for performing a global refresh of cached user security profiles may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for performing a virtual global refresh of cached user security profiles associated with a client in a database management system is also disclosed. An operator command is composed wherein the operator command comprises an indication that a global refresh of the cached user security profiles is required. The operator command is utilized to invoke a dynamic aging aware global refresh routine; whereby, responsive to said operator command, said dynamic aging aware global refresh routine completes said virtual global refresh and each of the cached user security profiles is refreshed prior to their use in an authorization check occurring subsequent to said virtual global refresh completion.

In this way, as discussed in greater detail infra, a global refresh of cached user security profiles is effectively accomplished almost instantaneously without causing a shut down of the database management system and without compromising integrity for ongoing DBMS requests. Although a global refresh of all cached user security profiles is anticipated to be a relatively infrequent event, the present disclosure teaches how to achieve all of the performance benefits of cached user security profiles without having to suffer the potentially disruptive effects of a global refresh.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method for performing a global refresh of cached user security profiles associated with a client in a database management system. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described and claimed herein. The following description is presented to enable one of ordinary skill in the art to make and use the present invention and is provided in the context of a patent application and its requirements.

Figure 1:
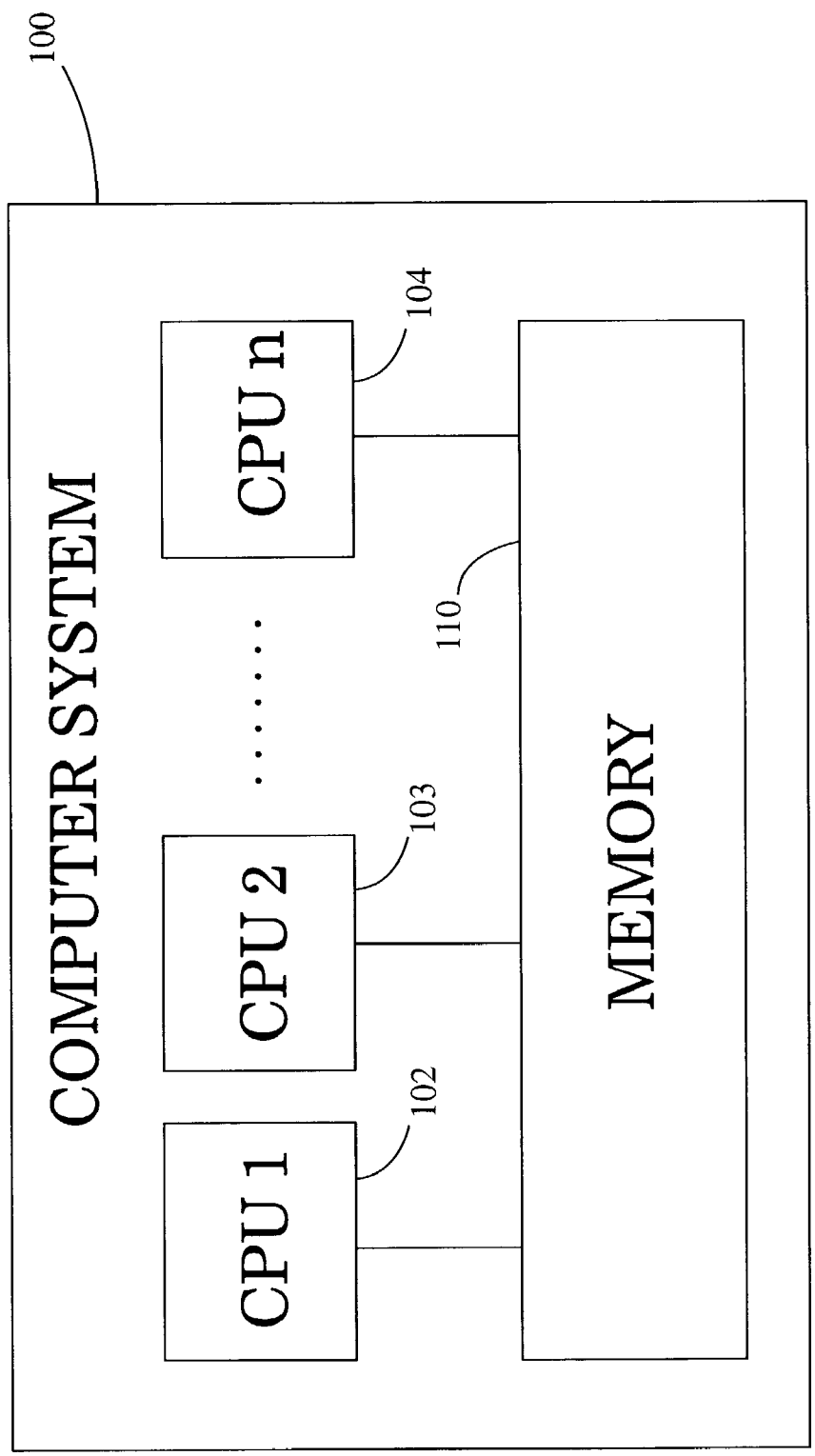
FIG. 1 is a block diagram of a typical computer system wherein the present invention may be practiced.

FIG. 1 is a block diagram of a computer system 100, such as the S/390 mainframe computer system, in which teachings of the present invention may be embodied. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, numerous other components may be utilized with computer system 100, such as input/output devices comprising keyboards, displays, direct access storage devices (DASDs), printers, tapes, etc. (not shown).

Although the present invention is described in a particular hardware environment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Figure 2:
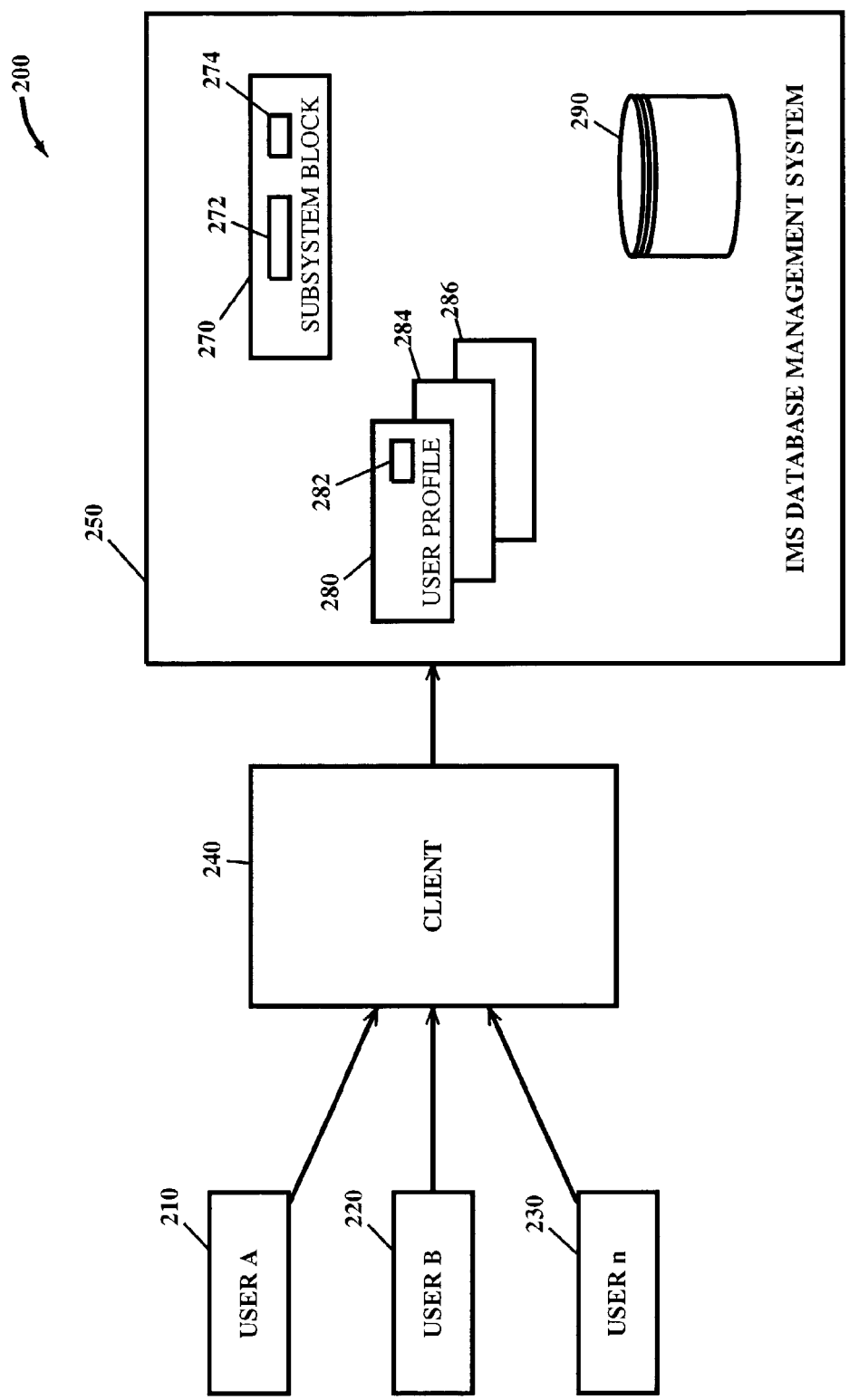
FIG. 2 shows a block diagram of an exemplary DBMS in accordance with the present invention.

Referring now to FIG. 2, a block diagram is shown illustrating an exemplary operating environment 200 wherein the present invention may be practiced. Users 210, 220 and 230, representing user A, user B and user n, respectively, are associated with IMS client 240. Client 240 is a software application that provides users 210–230 indirect access to IMS services. Typically, the number of users connected to client 240 can be very large, numbering into the tens of thousands in some installations. Exemplary client 240 software includes, for example, middleware products IMS Connect, MQSeries, Websphere etc. (MQSeries and Websphere are registered trademarks of International Business Machines Corporation in the United States, other countries, or both).

Client 240 communicates with IMS database management system 250. IMS 250 comprises subsystem block 270. Subsystem block 270 is associated with client 240 and is generated when client 240 first communicates with IMS 250. Subsystem block 270 comprises a creation timestamp 272, representing the current time stamp value requested from computer system 100 at the point in time in which subsystem block 270 is created. Subsystem block 270 further comprises master dynamic aging value 274. The master dynamic aging value 274 is initially set to zero when subsystem block 270 is first created and is adjusted to a non-zero value upon performing a global security refresh, as discussed in greater detail infra in conjunction with flow diagrams 300 and 400 of FIGS. 3 and 4, respectively, IMS 250 further comprises cached user security profiles 280, 284 and 286, associated with users 210 through 230, respectively. Cached user security profile 280 contains a sub-dynamic aging value 282, discussed in greater detail infra in conjunction with flow diagrams 300 and 400 of FIGS. 3 and 4, respectively. Likewise, cached user security profiles 284 and 286 also each contain a sub-dynamic aging value, but these details have been eliminated from block diagram 200 for simplicity, as this disclosure may be fully understood from a single iteration through user profile 280 with the understanding that this processing would be applicable to profile 284 and 286 as well.

IMS 250 further comprises permanent storage 290. Permanent storage 290 contains the source security information for users 210–230 from which cached user security profiles 280, 284 and 286, respectively, are generated and refreshed, as will be more fully understood from the detailed explanations accompanying flow diagrams 300 and 400 from FIG. 3 and FIG. 4, respectively. Those of ordinary skill in the art will recognize that permanent storage 290 may take one or several of numerous memory forms, such as magnetic disk, magnetic tape, flash electronic memory, optical disk and the like.

While the above block diagram 200 represents a suitable structure for teaching the present invention, it is to be understood that the purpose of this structure is of an exemplary nature and that numerous other structures may serve equally well in teaching the present invention. For example, other database management systems could be utilized in place of IMS and client 240 could be a custom software application developed for a single computer system as well as a generally available program product, such as IBM's MQSeries. Accordingly, the present invention is not limited to the particular exemplary structures but is to be accorded the widest scope consistent with the principles and features described herein.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
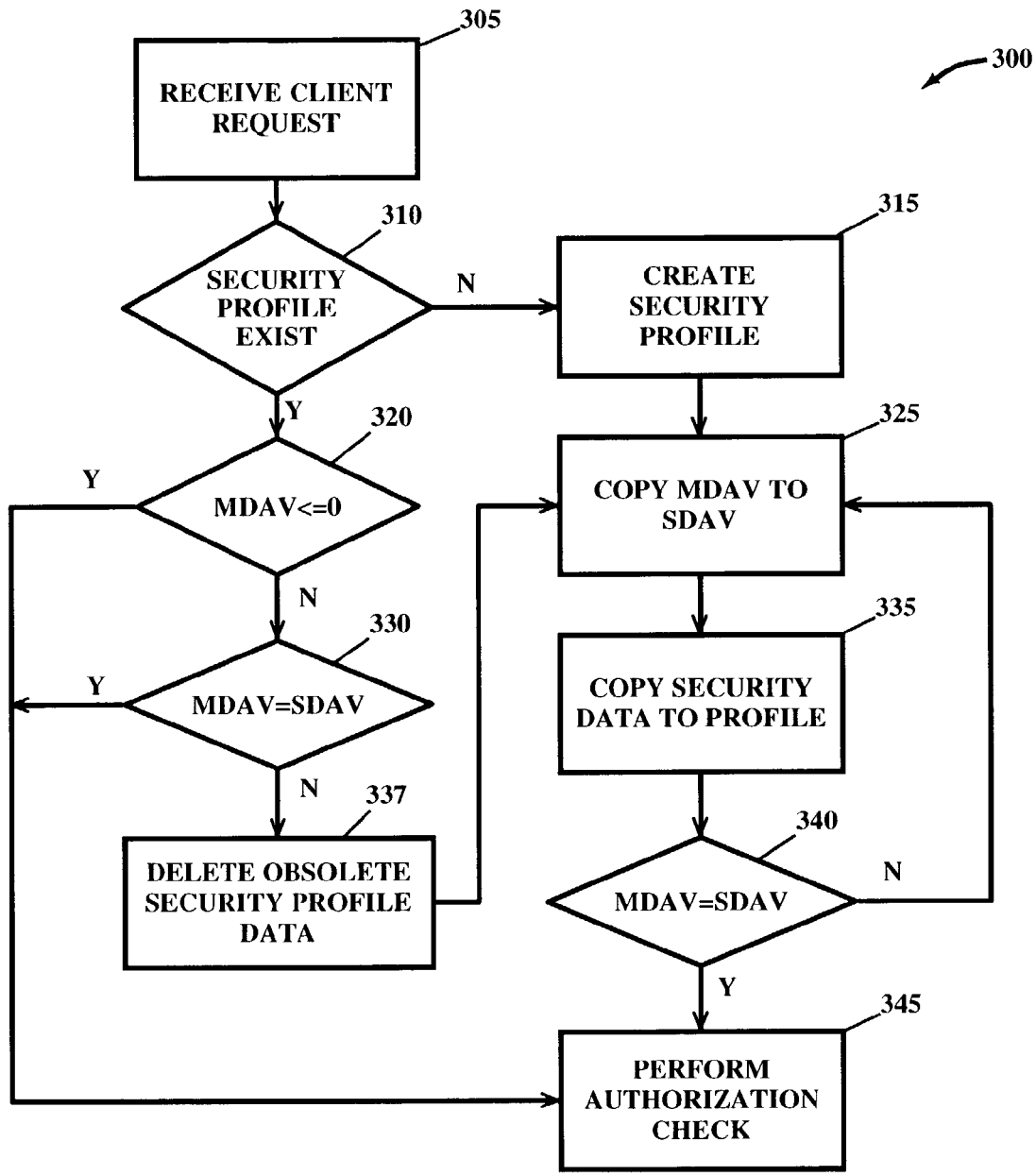
FIG. 3 is a flow diagram summarizing authorization checking in accordance with one embodiment of the present invention.

Referring now to FIG. 3, in conjunction with FIG. 2, flow diagram 300 illustrates the logic flow of a preferred embodiment for performing authorization checking in accordance with the present invention. First, in step 305, a request for service is received by IMS database system 200 from client 240 representing a user from the set of users 210–230. In the interest of specificity and clarity of discussion, we can assume that user to be user A 210. Next, in step 3 10 a test is made to determine if a cached user security profile exists for user A 210. If a cached user security profile does not exist, then in step 315, user security profile 280 is created in cache memory. Then, in step 325, the master dynamic aging value 274 from subsystem block 270 is copied to the sub-dynamic aging value 282 within the cached user security profile 280. Next, in step 335, security information for user A 210 is copied from permanent storage 290 to cached user security profile 280. Following the copy operation of step 335, a comparison is made, in step 340, between the master dynamic aging value 274 and the sub-dynamic aging value 282. If these values are not equal, then control returns to step 325 to repeat steps 325 through 340; otherwise, processing continues with step 345 where authorization checking is performed as described infra. Returning now to step 310, if a cached user security profile exists for user A 210, then processing continues with step 320 where a test is made to determine if master dynamic aging value 274 is less than or equal to zero. If not less than or equal to zero, then, in step 330, a test is made to determine if master dynamic aging value 274 is equal to sub-dynamic aging value 282. If these values are not equal, then, in step 337, the obsolete security data is deleted from user security profile 280 and control passes to step 325 where processing continues as described supra. Otherwise, the values are equal and control passes to step 345 where authorization checking is performed as described infra.

Returning now to step 320, if master dynamic aging value is equal to zero, then control passes to step 345 to perform authorization checking. This authorization checking proceeds by utilizing cached user security profile 280, which at this point in the processing is now known to be in perfect synchronization with the source security information for user A 210 residing in permanent storage 290.

Figure 4:
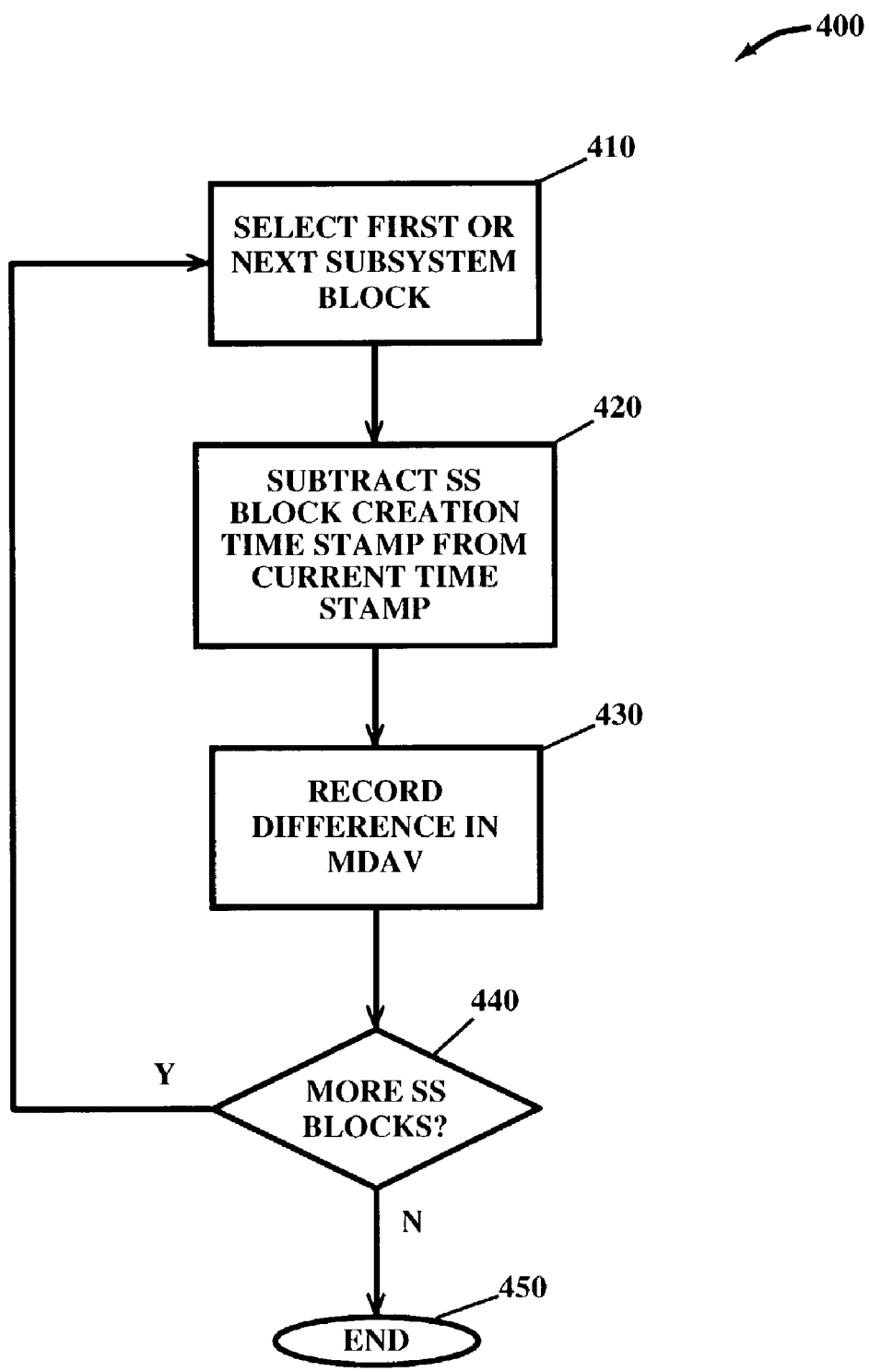
FIG. 4 is a flow diagram summarizing global refresh processing in accordance with one embodiment of the present invention.

Referring now to FIG. 4, in conjunction with FIG. 2, flow diagram 400 illustrates the logic flow of a preferred embodiment of the present invention for performing a "virtual" global security refresh (hereinafter referred to as simply a global security refresh). A global security refresh can be requested for one or more clients. Although FIG. 2 illustrates a single client 240 of DBMS 250, it is to be understood that this is a simplification to assist the reader in understanding the present invention. Accordingly, the present invention anticipates a global refresh process that encompasses a specification comprising a plurality of clients.

A global refresh process may be invoked by an operator command, wherein the operator is an authorized administrator of DBMS 250. Alternatively, a global refresh process may be invoked dynamically by software charged with monitoring the integrity of user security information. For example, an authorized administrator of a DBMS may observe, or be informed, that a hacker has sabotaged security information residing in permanent storage 290. Accordingly, the authorized administrator may rebuild this security information from various backup storage and/or recovery logs. However, once the rebuild is complete, a global refresh of all cached user security profiles is required to ensure the elimination of any possible contaminated cached user security profiles.

First, in step 410, the first or next subsystem block is selected for processing. In the interest of specificity and clarity of discussion, we can assume that this subsystem block is subsystem block 270. Next, in step 420, the subsystem block creation time stamp 272 is subtracted from the current time stamp and, in step 430, the result of this subtraction is stored in master dynamic aging value 274. If additional subsystem blocks are identified in the global refresh request, then control returns to step 410, discussed supra, otherwise, in step 450, global security refresh processing terminates.

By performing the subtraction in step 420, the unique resulting master dynamic aging value can be saved using substantially less memory than would otherwise be required to save the entire current time stamp. This aspect achieves multiple significant benefits. First, considerably less memory is consumed for cached user security profiles. Given a finite amount of cache memory dedicated to this purpose, a smaller user security profile may accommodate more profiles in the cache memory with commensurate performance improvement , as well as a reduction in actual physical memory resources. Furthermore, a compare operation on this smaller field takes less processor resource to accomplish, with additional performance benefits accruing as potentially millions of comparisons occur in even a single hour. Those of ordinary skill in the art will recognize that, while the preferred embodiment deploys subtraction in forming the master dynamic aging value, numerous other calculations may be performed to derive a functional master dynamic aging value from the current computer system 100 time stamp.

Taken in combination, flow diagram 300 and 400 in conjunction with supporting diagrams and detailed descriptions provide for an improved method for performing global refresh of cached user security profiles. As can be seen from flow diagram 400 in FIG. 4, the disclosed method for performing a global refresh effectually provides for an almost instantaneous "virtual" global refresh of all cached user security profiles associated with a specified client.

While not physically refreshing the affected cached user security profiles, this "virtual" global refresh accomplishes the equivalent desirable function. This is accomplished by ensuring, as disclosed in flow diagram 300 of FIG. 3, that any time a cached user security profile is required to be used following the "virtual" global refresh of an associated agent domain it is first refreshed from the corresponding source security information residing in permanent storage. Accordingly, all of the performance benefits from caching user security profiles are achieved, while avoiding the disruptive effects of a "real-time" physical global refresh. These disruptive effects, as discussed supra, include loss of availability, compromised security, and delayed response times for users.

Although the preferred embodiment has been disclosed using IMS as an exemplary platform, those of ordinary skill in the art will appreciate that the teachings contained herein apply to any hierarchical DBMS. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modifications and adaptations to the embodiment(s) shown may occur to one of ordinary skill in the art without departing from the scope of the present invention as set forth in the following claims. Thus, the scope of this invention is to be construed according to the appended claims and not limited by the specific details disclosed in the exemplary embodiments.

What is claimed:

1. A computer implemented method for performing a global refresh of cached user security profiles associated with a client in a database management system comprising:
   calculating a master dynamic aging value associated with said client responsive to an operator command to perform said global refresh;
   receiving a request from a user associated with said client;
   comparing a sub-dynamic aging value associated with a cached user security profile for said user with said master dynamic aging value in response to receiving the request; and
   refreshing said cached user security profile in response to said sub-dynamic aging value being different from said master dynamic aging value.

2. The method of claim 1 wherein said database management system is IMS.

3. The method of claim 2 wherein said master dynamic aging value is calculated by subtracting a subsystem block creation time stamp from a current time stamp.

4. The method of claim 3 wherein said calculated master dynamic aging value is saved in less bytes of memory than the number of bytes of memory required to save said current time stamp.

5. The method of claim 1 wherein said refreshing step comprises copying said master dynamic aging value to said sub-dynamic aging value and then copying source security information from permanent storage to said cached user security profile.

6. The method of claim 1 further comprising creating said cached user security profile in response to said cached user security profile not existing.

7. The method of claim 5 further comprising re-comparing said master dynamic aging value to said sub-dynamic aging value after said refreshing step, and repeating said refreshing step in response to said master dynamic aging value being different from said sub-dynamic aging value.

8. A method for performing a virtual global refresh of cached user security profiles associated with a client in a database management system comprising:
   composing an operator command, said operator command comprising an indication that a global refresh of said cached user security profiles is required; and
   utilizing said operator command to invoke a dynamic aging aware global refresh routine, whereby, responsive to said operator command, said dynamic aging aware global refresh routine completes said virtual global refresh and each of said cached user security profiles is refreshed in response to receiving a user request prior to their use in an authorization check occurring subsequent to said virtual global refresh completion.

9. A computer system for performing a global refresh of cached user security profiles associated with a client in a database management system, said computer system comprising:
   a computer;
   means for calculating a master dynamic aging value associated with said client responsive to an operator command to perform said global refresh;
   means for receiving a request from a user associated with said client;
   means for comparing a sub-dynamic aging value associated with a cached user security profile for said user with said master dynamic aging value in response to receiving the request; and means for refreshing said cached user security profile in response to said sub-dynamic aging value being different from said master dynamic aging value.

10. The computer system of claim 9 wherein said database management system is IMS.

11. The computer system of claim 10 wherein said master dynamic aging value is calculated by subtracting a subsystem block creation time stamp from a current time stamp.

12. The computer system of claim 11 wherein said calculated master dynamic aging value is saved in less bytes of memory than the number of bytes of memory required to save said current time stamp.

13. The computer system of claim 9 wherein said refreshing means comprises copying said master dynamic aging value to said sub-dynamic aging value and then copying source security information from permanent storage to said cached user security profile.

14. The computer system of claim 9 further comprising means for creating said cached user security profile in response to said cached user security profile not existing.

15. The computer system of claim 13 further comprising means for re-comparing said master dynamic aging value to said sub-dynamic aging value and repeating said refreshing means in response to said master dynamic aging value being different from said sub-dynamic aging value.

16. An article of manufacture for use in a computer system tangibly embodying computer instructions executable by said computer system to perform process steps for performing a global refresh of cached user security profiles associated with a client in a database management system, said process steps comprising:
   calculating a master dynamic aging value associated with said client responsive to an operator command to perform said global refresh;
   receiving a request from a user associated with said client;
   comparing a sub-dynamic aging value associated with a cached user security profile for said user with said master dynamic aging value in response to receiving the request; and
   refreshing said cached user security profile in response to said sub-dynamic aging value being different from said master dynamic aging value.

17. The article of manufacture of claim 16 wherein said database management system is IMS.

18. The article of manufacture of claim 17 wherein said master dynamic aging value is calculated by subtracting a subsystem block creation time stamp from a current time stamp.

19. The article of manufacture of claim 18 wherein said calculated master dynamic aging value is saved in less bytes of memory than the number of bytes of memory required to save said current time stamp.

20. The article of manufacture of claim 16 wherein said refreshing step comprises copying said master dynamic aging value to said sub-dynamic aging value and then copying source security information from permanent storage to said cached user security profile.

21. The article of manufacture of claim 16 further comprising creating said cached user security profile in response to said cached user security profile not existing.

22. The article of manufacture of claim 20 further comprising re-comparing said master dynamic aging value to said sub-dynamic aging value after said refreshing step, and repeating said refreshing step in response to said master dynamic aging value being different from said sub-dynamic aging value.

* * * * *